E. E. ROSE.
TROLLEY CLAMP.
APPLICATION FILED MAY 6, 1907. RENEWED JUNE 24, 1909.
931,345.  Patented Aug. 17, 1909.
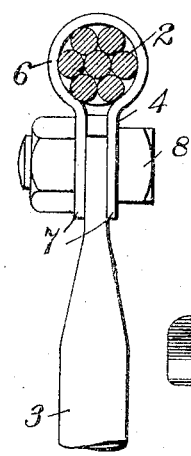
Fig. 1.
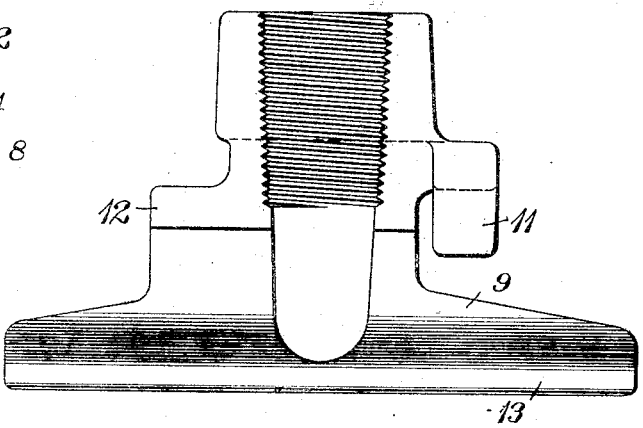
Fig. 2. Fig. 3.
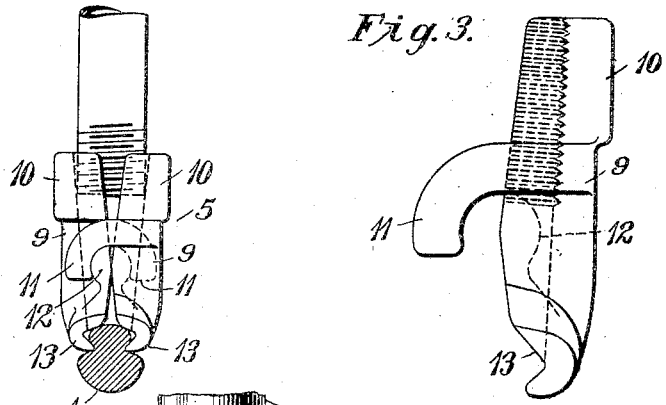
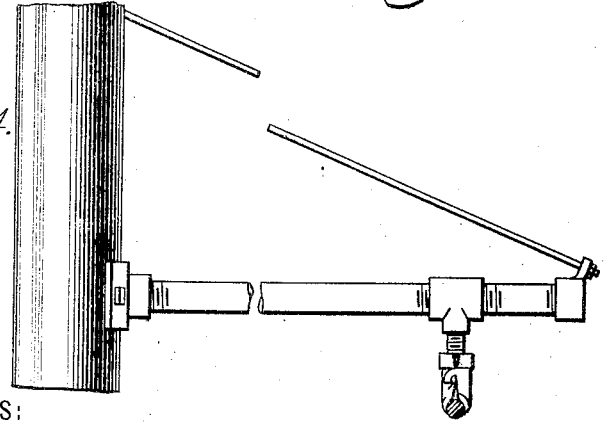
Fig. 4.
WITNESSES:
Fred H. Miller
R. F. Dearborn
INVENTOR
Edward E. Rose
BY
Wesley E. Carr
ATTORNEY

UNITED STATES PATENT OFFICE.

EDWARD E. ROSE, OF PITTSBURG, PENNSYLVANIA, ASSIGNOR TO WESTINGHOUSE ELECTRIC & MANUFACTURING COMPANY, A CORPORATION OF PENNSYLVANIA.

TROLLEY-CLAMP.

No. 931,345.     Specification of Letters Patent.     Patented Aug. 17, 1909.

Application filed May 6, 1907, Serial No. 372,163. Renewed June 24, 1909. Serial No. 504,019.

*To all whom it may concern:*

Be it known that I, EDWARD E. ROSE, a citizen of the United States, and a resident of Pittsburg, in the county of Allegheny and State of Pennsylvania, have invented a new and useful Improvement in Trolley-Clamps, of which the following is a specification.

My invention relates to means for suspending electric line conductors, and it has for its object to provide an improved clamping device whereby a trolley conductor may be simply and durably secured to a suitable support.

My improved clamping device is specially adapted for use with grooved trolley conductors that are suspended from messenger wires or cables, but its use is not limited in this regard and it may be employed in connection with conductors of circular cross-section that are supported from bracket arms or cross-wires, in accordance with a well known practice for low potential lines.

Figure 1 of the accompanying drawings is an end elevation of a trolley hanger embodying my invention, and Figs. 2 and 3 are detail views of the clamping device shown in Fig. 1. Fig. 4 is a view, similar to Fig. 1, of a bracket form of trolley line suspension which embodies my improved trolley clamp.

Referring to Figs. 1, 2 and 3 of the drawings, a trolley conductor 1 is suspended from a messenger wire or cable 2 by means of a hanger rod 3, a cable clamp 4 and a trolley clamp 5. The cable clamp 4 comprises a loop 6 which surrounds the cable 2 and is provided with a pair of ears 7. The upper end of the connecting rod 3 is flattened to fit between the ears 7 and is secured in position by means of a bolt 8. The trolley clamp 5 comprises a pair of interchangeable jaw members 9 having shank projections 10, hook projections 11 and shoulder projections 12. The hook projection of one jaw member is adapted to coöperate with the shoulder projection of the other to form an open hinge joint, and the shank projections 10 together constitute a flaring screw-threaded sleeve which receives one end of the hanger rod 3. The adjacent clamping surfaces of the jaw members may be of considerable length and are provided with claws 13, or are otherwise adapted to conform to the shape of the trolley conductor 1, which may be grooved in a well known manner. The adjacent surfaces of the shank projections 10 diverge so as to produce a screw-threaded flaring sleeve and, consequently, the clamping jaws are forced together when the hanger rod 3 is screwed into the sleeve. If the trolley clamp is used to support a wire of circular cross-section, as illustrated in Fig. 4, the clamping jaws may preferably be provided with concave cylindrical surfaces to conform to the trolley section.

My improved trolley clamp is of special advantage, since the parts of which it is composed are simple and interchangeable and are relatively few in number.

I claim as my invention:

1. A clamp comprising a pair of detachably hinged jaw members having shanks projecting therefrom to form a screw-threaded tapered sleeve, and a hanger rod the lower end of which is screwed into said sleeve to separate said shanks.

2. In a trolley clamp, the combination with a pair of interchangeable jaw members having coöperating hook and shoulder projections, and shank projections which form a screw-threaded taper sleeve, of a hanger rod the lower end of which is screwed into said sleeve to force the shank projections apart.

3. The combination with supporting means, a suspended hanger rod having a screw-threaded lower end, and a trolley conductor, of a clamp comprising a pair of interchangeable jaw members which engage the trolley conductor, coöperating hook and shoulder projections whereby they are detachably hinged together, and shank projections having screw-threaded, tapered inner faces which are directly engaged and forced apart by the lower end of the hanger rod.

In testimony whereof, I have hereunto subscribed my name this 30th day of April, 1907.

EDWARD E. ROSE.

Witnesses:
   EDWARD W. NARY,
   BIRNEY HINES.